United States Patent [19]

Peled et al.

[11] 4,375,501

[45] Mar. 1, 1983

[54] ELECTROCHEMICAL CELL

[75] Inventors: Emanuel Peled, Even Yehuda, Israel; Anthony Lombardi, Winchester, Mass.

[73] Assignee: GTE Laboratories Incorporated, Waltham, Mass.

[21] Appl. No.: 197,884

[22] Filed: Oct. 17, 1980

[51] Int. Cl.³ .............................................. H01M 6/14
[52] U.S. Cl. .................................... 429/94; 429/101; 429/194; 429/197
[58] Field of Search ............... 429/101, 194, 197, 199, 429/94

[56] References Cited

U.S. PATENT DOCUMENTS

| | | | |
|---|---|---|---|
| Re. 30,661 | 6/1981 | Eisenberg | 429/194 |
| 3,891,458 | 6/1975 | Eisenberg | 429/197 |
| 4,112,202 | 9/1978 | Hug et al. | 429/94 |
| 4,113,929 | 9/1978 | Margalit | 429/194 |
| 4,228,227 | 10/1980 | Saathoff | 429/194 |

*Primary Examiner*—Anthony Skapars
*Attorney, Agent, or Firm*—David M. Keay

[57] ABSTRACT

An electrochemical cell having an oxidizable anode material, specifically lithium, a cathode current collector, and an electrolytic solution in contact with the anode material and the cathode current collector. The solution comprises a solvent of a reducible liquid cathode material, specifically thionyl chloride, and an electrolyte solvent, specifically lithium tetrachloroaluminate, dissolved therein. The solute is present in an amount to produce in excess of 75% of its room temperature saturation concentration in the solvent.

11 Claims, 1 Drawing Figure

U.S. Patent  Mar. 1, 1983  4,375,501
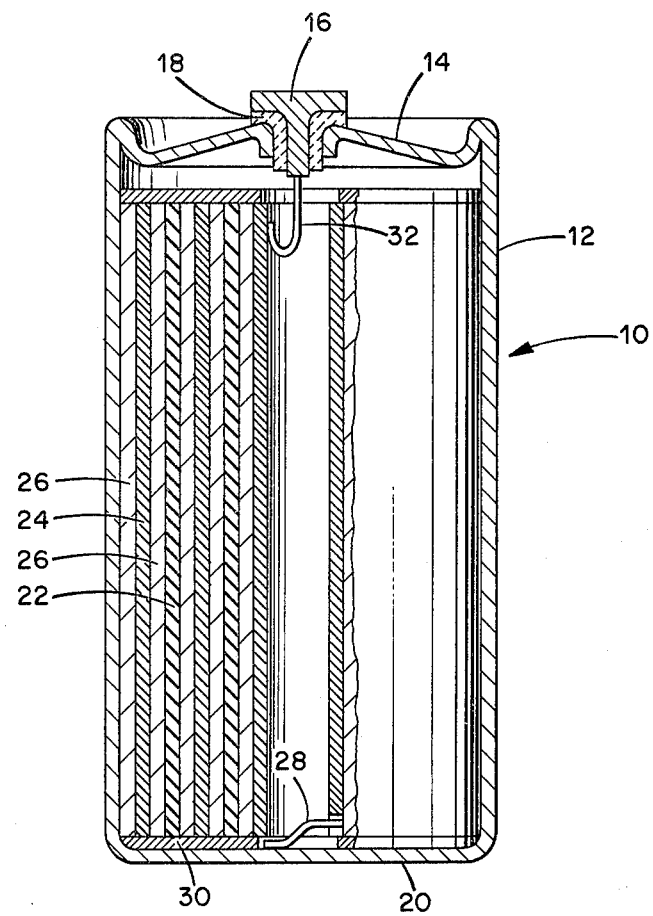

ELECTROCHEMICAL CELL

BACKGROUND OF THE INVENTION

This invention relates to electrochemical cells. More particularly, it is concerned with high power primary electrochemical cells having an oxidizable anode, for example lithium, and a reducible liquid cathode material, for example thionyl chloride or sulfuryl chloride.

Electrochemical cells which employ soluble or liquid cathode materials have undergone rapid development in recent years. In these cells the active cathode material is a fluid solvent and the active anode material is a highly electropositive metal, such as lithium. An electrolyte solute is dissolved in the solvent cathode material to provide electrical conductivity. During discharge the solvent is electrochemically reduced on a cathode current collector to yield ions, e.g., halide ions, which react with positive metal ions from the anode to form insoluble metal salts, e.g., metal halides.

One particular type of electrochemical cell of the foregoing class contains an anode of lithium and a reducible liquid cathode of thionyl chloride or sulfuryl chloride. Typically the electrolyte solute dissolved in the solvent is lithium tetrachloroaluminate. These electrochemical cells have proven to have outstanding weight and volume energy density. The lithium anode and the cathode current collector are relatively thin, less than 1 and 2 mm, respectively. Thus, these cells have a high electrode surface to volume ratio and, therefore, very high power capability.

When such a cell becomes short circuited, either internally or externally, very high short circuit currents flow through the cell. These currents cause heating of the components within the cell which may be sufficient to cause melting of some of the materials. Lithium melts at about 180° C. Molten lithium may react with the thionyl chloride or with the discharge products produced within the cell in a violent chemical reaction with possible undesirable consequences.

SUMMARY OF THE INVENTION

An electrochemical cell in accordance with the present invention provides a greater tolerance to short circuit conditions by limiting the current which flows and the possible consequent destructive chemical reactions which may occur. A cell in accordance with the invention includes an oxidizable anode material and a cathode current collector. An electrolytic solution which is in contact with the anode material and the cathode current collector comprises a solvent of a reducible liquid cathode material and an electrolyte solute dissolved therein. The solute is present in an amount to produce in excess of 75% of its room temperature saturation concentration in the solvent.

It is believed that in an electrochemical cell in accordance with the present invention having an exceptionally heavy concentration of solute in the solvent that during short circuit conditions the concentration of solute near the anode increases and near the cathode current collector decreases. Since the initial concentration of solute is close to saturation, the solute may start to precipitate on the anode during the short circuit condition. In addition, the concentration of liquid cathode material near the anode is reduced. As a result, in a cell employing a lithium anode and thionyl chloride as the cathode material with a solute of lithium tetrachloroaluminate present in a 3 to 5.5 molar concentration, there are insufficient thionyl chloride molecules to form a lithium chloride layer on the anode. Therefore, the electrolyte molecules such as $AlCl_4^-$ may be reduced to form a lithium-aluminum alloy or aluminum coating on the surface of the lithium anode. With the anode completely covered by precipitation of the solute and formation of the coating, further reaction between the anode and the solute, or the cathode material, or the reduction products is slowed down. The result is a lessening of the short circuit current and, finally, deactivation of the cell.

BRIEF DESCRIPTION OF THE DRAWING

The single FIGURE of the drawing is a representation in cross-section with portions broken away illustrating an electrochemical cell in accordance with the present invention.

For a better understanding of the present invention together with other and further objects, advantages, and capabilities thereof, reference is made to the following discussion and appended claims in connection with the above-described drawing.

DETAILED DESCRIPTION OF THE INVENTION

The single FIGURE of the drawing illustrates a primary electrochemical cell 10 in accordance with the present invention. The cell 10 is formed of an outer case 12 of conductive material which is sealed by a welded cover 14. Located centrally of the cover is the cathode terminal 16, which is the positive external terminal. The cathode terminal is separated from the outer case by a sealing ring 18 of insulating material. The anode terminal, which is the negative external terminal of the cell, is provided by the outer case 12, more particularly, the bottom surface 20.

The electrodes of the cell are located within the interior of the outer case 12. The electrodes are spirally wound electrodes of known construction including an anode 22, as of lithium, and a cathode current collector 24, which is usually a screen of inert material supporting active layers of carbon. The electrodes are separated from each other and from the outer case 12 by intervening porous separators 26 of insulating material. The dimensions and relative placement of the electrodes are such that all portions of both sides of the anode 22 are directly opposite and facing surfaces of the cathode current collector 24. The anode 22 is connected to the bottom 20 of the case 12 by a welded connecting strip 28 which passes through an opening in an insulating disk 30 and through openings in the cathode current collector and the separators. The cathode current collector 24 is connected to the cathode terminal 16 by a wire 32.

The anode 22 is an oxidizable material. Preferably, as is well known in the art, the anode contains lithium as the active material. Other oxidizable materials which may be employed in electrochemical cells of this type include other alkali metals and also alkaline earth metals.

The cell contains an electrolytic solution which includes a solvent of a reducible liquid cathode material. Among the cathode materials found useful are fluid oxyhalides, fluid non-metallic oxides, fluid non-metallic halides, and mixtures thereof. Oxyhalides of sulfur and phosphorus have been found particularly useful and for various practical reasons thionyl chloride and sulfuryl chloride have been very widely used.

Electrolyte solutes are added to the solvent in order to raise the conductivity of the solution since the cathode solvent materials typically are of low conductivity. In accordance with the present invention large concentrations of solutes are included to limit the short circuit currents as explained hereinabove. The solute provides at least one anion having the formula $X^-$, $MX_4^-$, $M'X_6^-$, and $M''X_6^-$, where M is an element selected from the group consisting of aluminum and boron; M' is an element selected from the group consisting of phosphorus, arsenic, and antimony; M" is an element selected from the group consisting of tin, zirconium, and titanium; and X is a halogen.

The solute also provides at least one cation selected from the group consisting of alkali metals, the alkaline earth metals, the lanthanides, $POCl_2^+$, $SOCl^+$, and $SO_2Cl^+$. Among the solutes found most useful are lithium tetrachloroaluminate, lithium tetrachloroborate, lithium tetrafluoroborate, lithium hexafluorophosphate, lithium hexafluoroarsenate, lithium hexafluoroantimonate, lithium hexachlorostannate, lithium hexachlorozirconate, lithium hexachlorotitanate, and lithium chlorosulfate.

Following are examples of electrochemical cells of prior art construction and of cells in accordance with the present invention which were subjected to short circuit conditions.

EXAMPLE I

An electrochemical cell of prior art type in standard D size configuration was constructed with an active lithium anode area of about 220 cm². The lithium anode was 0.6 mm thick, the carbon cathode current collector was 1 mm thick, and the separators were 0.18 mm thick. The electrolytic solution was 1.8 molar lithium tetrachloroaluminate in thionyl chloride. The cell was short circuited between the terminals, and the short circuit current reached a peak of about 30 amperes. Within about three minutes of shorting, the temperature of the can was 150° C. and a chemical reaction took place within the cell destroying the cell.

EXAMPLE II

A D size cell in accordance with the present invention was constructed employing a cathode current collector having dimensions of 15 inches by 1¾ inches by 0.033 inch thick. The lithium anode was 12 inches by 1½ inches by 0.020 inch thick. Insulating separators 0.13 mm thick were placed between the anode and cathode current collector electrodes. The electrodes and separators were spirally wound in a cylindrical configuration such that both sides of the anode faced the cathode current collector. The electrolytic solution was a 4.3 molar solution of lithium tetrachloroaluminate in thionyl chloride. The cell was short circuited externally. The temperature of the can increased steadily and after six minutes the external temperature of the can was 248° C., considerably higher than the melting point of lithium at 180° C. The internal temperature was probably about 300° C. At this point pressure within the cell caused rupturing at the cover. The case was not damaged and maintained its shape and integrity.

EXAMPLE III

A D size electrochemical cell similar to that of Example II was built employing a solution of 1.6 molar lithium tetrachloroaluminate and 1.6 molar sodium tetrachloroaluminate dissolved in thionyl chloride. The cell was shorted externally. The temperature increased steadily, but there was no chemical reaction at either the melting point of sodium (98° C.) nor at the melting point of lithium. When the external can temperature reached 196° C., the can ruptured due to internal pressures; not chemical reaction.

EXAMPLE IV

An AA size cell of the prior art type was built with a solution of 1.8 molar tetrachloroaluminate dissolved in thionyl chloride. When sort circuited, the cell produced a maximum short circuit current of 2.4 amperes and reached a maximum external can temperature of 103° C.

EXAMPLE V

An AA size cell generally similar to that of Example IV was built with an electrolytic solution of 4.3 molar lithium tetrachloroaluminate in thionyl chloride. The maximum short circuit current produced was 0.79 amperes and the maximum external temperature of the can was 60° C.

While there has been shown and described what are considered preferred embodiments of the present invention, it will be obvious to those skilled in the art that various changes and modifications may be made therein without departing from the invention as defined by the appended claims.

What is claimed is:

1. An electrochemical cell comprising
an oxidizable anode material;
a cathode current collector; and
an electrolytic solution, in contact with the anode material and the cathode current collector, comprising a solvent of a reducible liquid cathode material and an ionic solute dissolved therein;
the solution having a concentration of ionic solute greater than 3 molar.

2. An electrochemical cell in accordance with claim 1 wherein
the oxidizable anode material is selected from the group consisting of alkali metals and alkaline earth metals;
the reducible liquid cathode material is selected from the group consisting of fluid oxyhalides, fluid non-metallic oxides, fluid non-metallic halides, and mixtures thereof; and
the ionic solute provides at least one anion having the formula $X^-$, $MX_4^-$, $M'X_6^-$, and $M''X_6^{--}$, where M is an element selected from the group consisting of aluminum and boron; M' is an element selected from the group consisting of phosphorus, arsenic, and antimony; M" is an element selected from the group consisting of tin, zirconium, and titanium; and X is a halogen; the ionic solute also providing at least one cation selected from the group consisting of alkali metals, the alkaline earth metals, the lanthanides, $POCl_2^+$, $SOCl^+$, and $SO_2Cl^+$.

3. An electrochemical cell in accordance with claim 2 wherein
said anode material includes lithium; and
said ionic solute is selected from the group consisting of lithium tetrachloroaluminate, lithium tetrachloroborate, lithium tetrafluoroborate, lithium hexafluorophosphate, lithium hexafluoroarsenate, lithium hexafluoroantimonate, lithium hexachloroantimonate, lithium hexachlorostannate, lithium hexachlorozirconate, lithium hexachlorotitanate, and lithium chlorosulfate.

4. An electrochemical cell in accordance with claim 2 wherein
said anode material includes lithium;
said solvent of a reducible liquid cathode material is selected from the group consisting of oxyhalides of sulfur and phosphorus; and
said ionic solute is selected from the group consisting of lithium tetrachloroaluminate and sodium tetrachloroaluminate and mixtures thereof.

5. An electrochemical cell in accordance with claim 4 wherein said ionic solute is lithium tetrachloroaluminate.

6. An electrochemical cell in accordance with claim 4 wherein said solvent is selected from the group consisting of thionyl chloride and sulfuryl chloride.

7. An electrochemical cell in accordance with claim 5 wherein said solvent is thionyl chloride.

8. An electrochemical cell in accordance with claim 1 wherein all portions of the surface of the anode material are directly opposite and facing surfaces of the cathode current collector and are spaced therefrom by separators of insulating material.

9. An electrochemical cell comprising
an oxidizable anode containing lithium;
a cathode current collector; and
an electrolytic solution, in contact with the anode and the cathode current collector, comprising a solvent of thionyl chloride and an electrolyte solute of lithium tetrachloroaluminate dissolved therein;
the solution having a concentration of lithium tetrachloroaluminate greater than 3 molar.

10. An electrochemical cell in accordance with claim 9 wherein said solution has a concentration of lithium tetrachloroaluminate of approximately 4.3 molar.

11. An electrochemical cell in accordance with claim 9 wherein
said anode is an elongated sheet;
said cathode current collector is an elongated sheet;
said sheets being rolled to form a cylindrical structure and having intervening separators of insulating material therebetween;
all portions of both sides of said anode being directly opposite and facing surfaces of said cathode current collector and being spaced therefrom by said separators.

* * * * *